(No Model.)
C. R. ARNOLD.
SECONDARY BATTERY.
No. 489,115. Patented Jan. 3, 1893.
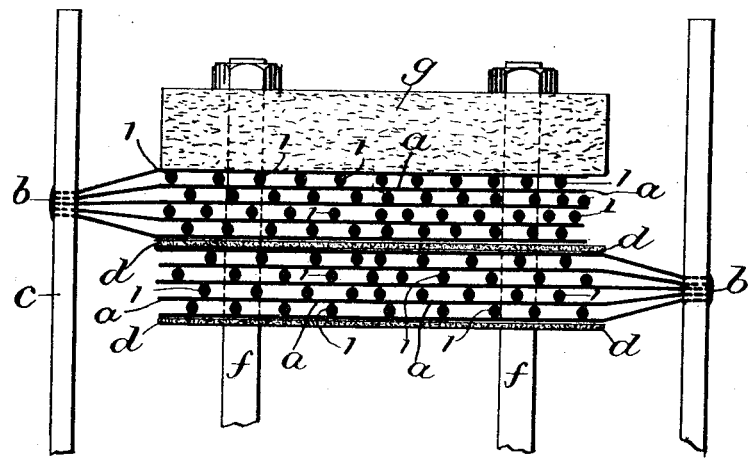
ATTEST:
INVENTOR:
Craig R. Arnold
Attorney

UNITED STATES PATENT OFFICE.

CRAIG RITCHIE ARNOLD, OF SHARON HILL, PENNSYLVANIA.

SECONDARY BATTERY.

SPECIFICATION forming part of Letters Patent No. 489,115, dated January 3, 1893.

Application filed May 21, 1892. Serial No. 433,904. (No model.)

*To all whom it may concern:*

Be it known that I, CRAIG RITCHIE ARNOLD, a citizen of the United States, and a resident of Sharon Hill, in the county of Delaware and State of Pennsylvania, have invented a certain new and useful Secondary Battery, of which the following is a specification.

My invention relates to electrodes for secondary batteries and is designed as an improvement upon secondary batteries wherein the electrode is a compound electrode composed of a number of superposed plates of lead, or other metal, separated from one another to allow space for the active material formed electrolytically after the immersion of the electrode in a solution.

I shall hereinafter describe my invention as carried out in a secondary battery wherein the electrodes are composed of lead and the active material is formed by passing an electric current through the electrodes while immersed in a solution of sulphuric acid or other suitable chemical, but it will be understood that my invention is not limited to plates of lead and may be applied to electrodes of other metals immersed in other solutions or that other solutions might be used with plates of lead.

It has heretofore been proposed to construct a secondary battery with compound electrodes each composed of a number of lead plates the different compound electrodes being separated by sheets of celluloid and all being piled together and secured by suitable bolts. In a battery of this kind it has further been proposed to separate the individual plates of each electrode by sand to allow a space in which the peroxide of lead finds place. The sand with its sharp edges may cut the lead but no harm will ensue; if, however, it gets between the lead and the celluloid plates it is liable to render the battery inoperative. Moreover, when sand is employed the sand must be screened, graded, washed in sulphuric acid and dried, which makes it rather expensive.

My invention consists essentially in interposing between the individual plates of each compound electrode, small pieces of lead or similar metal, preferably the same as that of which the plates themselves are composed, these small lead pieces taking the place of the sand as heretofore employed and serving the double purpose of separating the individual plates a sufficient distance and of being itself an active body instead of an inert one as the sand is. The small pieces of lead spoken of are conveniently formed of lead shot and in practice I find that No. 8, lead shot serves the purpose admirably.

In the accompanying drawings, I have shown in side elevation a part of a battery in which electrodes constructed in accordance with my invention are employed. Two electrodes are shown. Each consists of a series of lead plates *a*, which may be perforated if desired at a number of points to allow free circulation of the liquid. In each electrode five plates are employed and at one side they are massed or joined, as illustrated at the point *b*, where they are fixed or soldered into a bar *c*, which forms a terminal of the battery. The rather thin plates *a*, are joined to one another and to the bars or rods *c*, by massing the projections from the plates *a*, together, passing them through a hole from the bar *c*, and then fusing down the exposed ends by means of an electric arc applied at the desired point according to the arc method of welding wherein the material to be acted upon forms one electrode and the pencil of carbon or other material, applied to the point of welding and withdrawn, forms the other electrode. The plates *a*, might be joined together and to the bar *c*, in any other desired way. The electrodes formed each of a number of superposed plates *a*, are separated from one another as shown by plates of celluloid *d*, or other suitable material. Bolts *f*, as indicated may be employed for fastening a number of the electrodes together, a plate of porcelain or similar material being employed at the ends of the pile, as indicated at *g*. The individual plates *a*, of each electrode are separated or held apart by the small pieces of lead, preferably in the forn of shot, indicated by the numeral 1. These may be interposed in greater or less number but preferably only as a single layer, the individual pieces of which are slightly separated to allow plenty of space for the active material formed by the electrolytical process after the manner employed in forming the electrodes of a Planté cell.

What I claim as my invention is:—

1. In a secondary battery, a compound electrode consisting of a number of superposed metal plates separated from one another by small pieces of metal to allow a space for the active material electrolytically produced, as and for the purpose described.

2. In a secondary battery, a compound electrode consisting of a number of plates of lead separated from one another by lead shot in a single layer, and clamped or held together by any suitable means, as and for the purpose described.

3. In a secondary battery, a compound electrode consisting of a number of plates of lead superposed upon one another and separated by small pieces of lead in a single layer, the said plates being all clamped together in combination with a bar or rod having an opening or perforation in which projections from said plate are massed and soldered together.

4. In a secondary battery, an electrode consisting of a number of superposed plates of lead having interposed between them lead shot and all clamped together, as and for the purpose described.

Signed at Chester, in the county of Delaware and State of Pennsylvania, this 18th day of May, A. D. 1892.

CRAIG RITCHIE ARNOLD.

Witnesses:
J. LENTZ GARRETT,
HARRY WALTER ZOOK.